United States Patent [19]

Friauf et al.

[11] 4,421,986
[45] Dec. 20, 1983

[54] NUCLEAR PULSE DISCRIMINATOR

[75] Inventors: Walter S. Friauf; Rodney A. Brooks, both of Bethesda, Md.

[73] Assignee: The United States of America as represented by the Department of Health and Human Services, Washington, D.C.

[21] Appl. No.: 209,305

[22] Filed: Nov. 21, 1980

[51] Int. Cl.³ .................................................. G01T 1/20
[52] U.S. Cl. .................................................. 250/369
[58] Field of Search ........................................ 250/369

[56] References Cited

U.S. PATENT DOCUMENTS

| 2,750,513 | 6/1956 | Robinson et al. | 250/369 |
|---|---|---|---|
| 3,493,750 | 2/1970 | Morgan et al. | 250/369 |
| 3,558,887 | 1/1971 | Hick | 250/370 |
| 3,842,278 | 10/1974 | Noakes | 250/369 |
| 3,859,532 | 1/1975 | Luitwieler | 250/369 |
| 4,031,392 | 6/1977 | Giraud et al. | 250/369 |
| 4,049,966 | 9/1977 | Luitweiler | 250/369 |
| 4,181,855 | 1/1980 | Horrocks | 250/363 R |
| 4,186,307 | 1/1980 | Tanaka et al. | 250/363 R |

Primary Examiner—John S. Heyman
Attorney, Agent, or Firm—Browdy & Neimark

[57] ABSTRACT

A discriminator circuit for use with a scintillation detector, wherein the scintillation detector output is fed to a time discriminator and the output of the time discriminator is fed via a short precision delay device to one input terminal of a transmission gate device. The detector output signal is also fed to a fast energy discriminator whose output is furnished as an enable signal to the other input terminal of the transmission gate device, providing time output pulses. Timing pulses from the transmission gate device are furnished to a long non-precision delay device and then to one input terminal of a transmission gate. The detector output signal is also fed through a slow energy discriminator and an enable line to another input terminal of the last-named transmission gate, providing energy output pulses in an energy output line which are furnished to the subsequent portion of the system.

15 Claims, 4 Drawing Figures

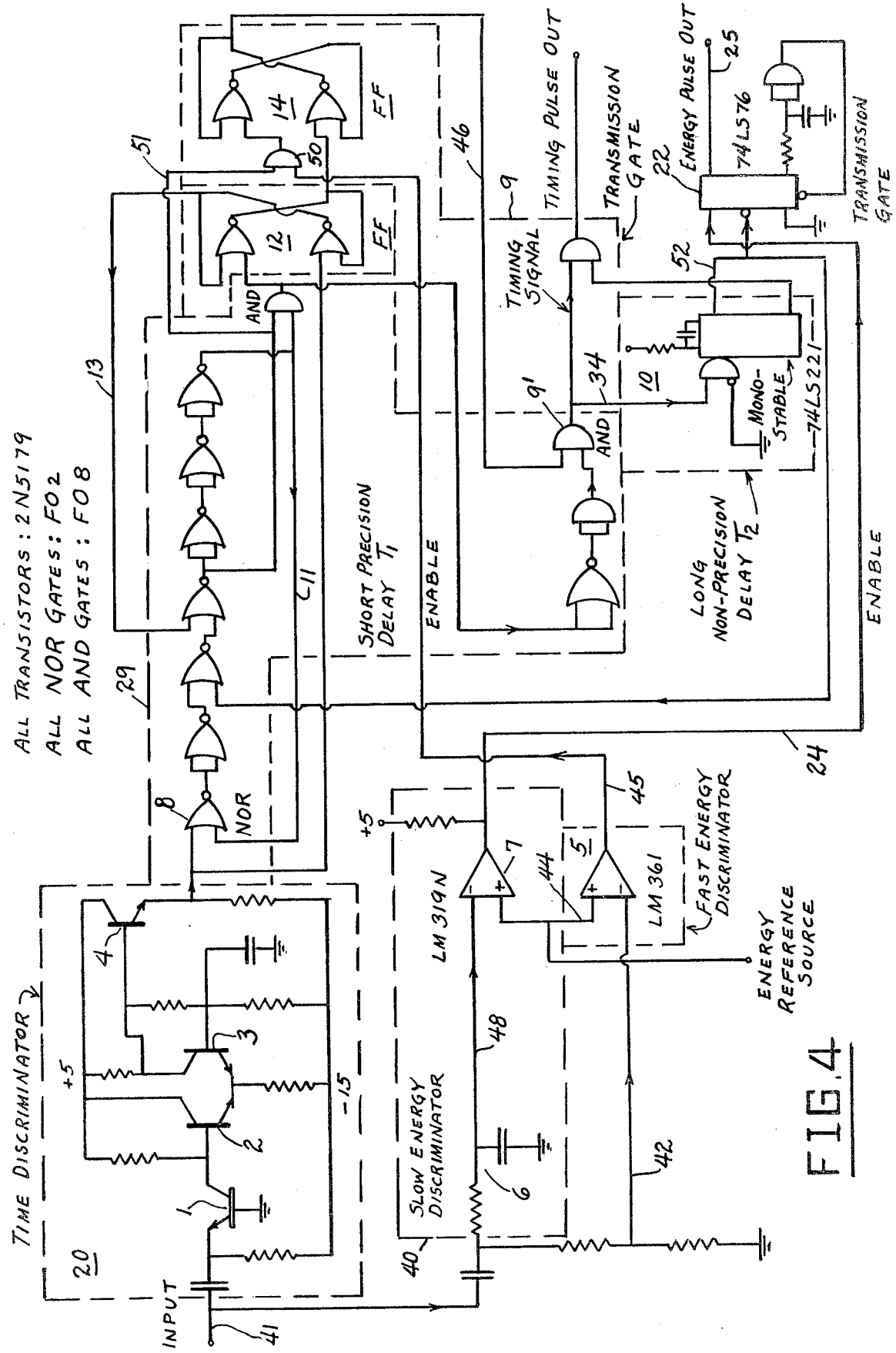

NUCLEAR PULSE DISCRIMINATOR

FIELD OF THE INVENTION

This invention relates to apparatus for measuring nuclear radiation, and more particularly to a discriminator intended to be used in conjunction with a scintillation detector to detect gamma rays, or with other types of particle detectors.

BACKGROUND OF THE INVENTION

Conventional discriminators for use with scintillation detectors often employ a timing discriminator and precision delay means to delay the output of the timing discriminator sufficiently to allow energy level verification before transmission of said output to the remainder of the system. This produces a serious drawback due to the timing instability of the delay, this being proportional to the magnitude of the delay itself. With the older sodium iodide detectors the delay needed for reliable energy verification is low enough so that no great problem exists, and in some instances energy vertification is even dispensed with entirely. With the advent of the new bismuth germanate detectors, however, a much longer delay is needed, causing a severe problem. One way to alleviate this is to employ a different type of data handling system which can utilize time and energy signals displaced in time, and thus the discriminator assembly may also employ an energy discriminator along with the timing discriminator, with a long delay means which does not have to be so precise, since it does not affect the timing accuracy of the timing pulse. The principal drawback of the first-described system is thus overcome, but a new problem is introduced: since the timing outputs are not subject to any energy verification, the number due to low-energy spurious signals might well exceed the count rate capacity of the subsequent system, causing saturation. There is a definite need to overcome this problem.

SUMMARY OF THE INVENTION

The system of the present invention is intended to overcome the above-described problems. It has a configuration which provides a fast, approximate energy verification together with a short precision delay to eliminate most timing pulses caused by very low spurious inputs. The resulting timing outputs are then provided with a delayed accurate energy verification somewhat similar to that in the second-described system mentioned above.

The discriminator of this invention is intended to be used in conjunction with a bismuth germanate scintillation detector to detect gamma rays, but may also be used with other types of particle detectors. The discriminator receives signals from the scintillation detector and provides two outputs:

1. A timing pulse whose leading edge is aligned as closely as possible in time with the first sensible evidence of a signal from the scintillation detector, except that this output will be delayed by a precisely fixed interval of the order of 50 nano-seconds, and no timing pulse will be generated at all if the energy of the incoming signal during the first 30 nano-seconds is below a pre-set level.

2. An energy verification pulse about 500 nano-seconds after each timing pulse output for those incoming signals whose energy during the first 500 nano-seconds exceeds a pre-set level.

Accordingly, an object of the invention is to provide for improved nuclear pulse discrimination; another object is to provide an improved discriminator for a scintillation detector which eliminates the disadvantages and deficiencies of the previously employed discriminators.

A further object of the invention is to provide an improved scintillation detector discriminator assembly which includes a timing discriminator and which delays the output of said timing discriminator sufficiently to allow energy verification before it is transmitted to the remainder of the system, and which minimizes outputs caused by low-energy spurious signals.

A still further object of the invention is to provide an improved scintillation detector discriminator assembly which can be satisfactorily employed with detectors of the bismuth germanate type.

A still further object of the invention is to provide an improved scintillation detector discriminator assembly which provides a time delay for energy verification of sufficient length to permit the use of scintillation detectors of the bismuth germanate type without exceeding the count capacity of the subsequent system, and thereby without causing saturation of said subsequent system.

A still further object of the invention is to provide an improved scintillation detector discriminator assembly which can be used with scintillation detectors of the bismuth germanate type, as well as with a wide range of other types of particle detectors, and which employs a fast approximate energy verification together with a short precision delay and substantially eliminates timing pulses resulting from very low energy spurious inputs.

BRIEF DESCRIPTION OF THE DRAWINGS

Further objects and advantages of the invention will become apparent from the following description and claims, and from the accompanying drawings, wherein:

FIG. 4 is a detailed schematic wiring diagram of a typical scintillation detector discriminator constructed according to the system shown in FIG. 3.

DESCRIPTION OF A PREFERRED EMBODIMENT

Figure 1:
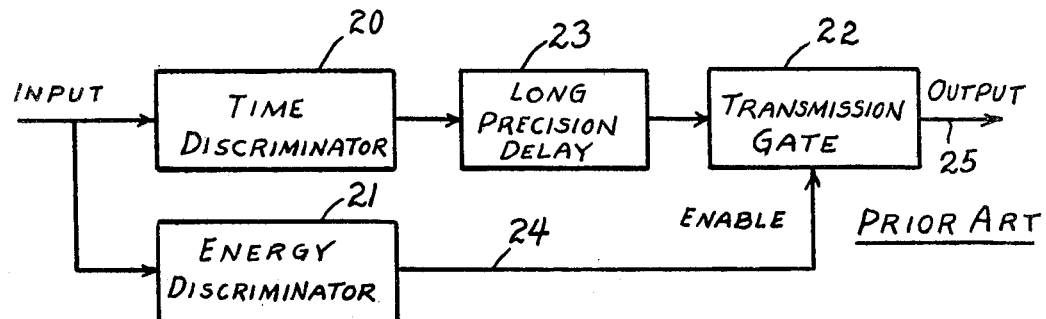
FIG. 1 is a block diagram showing a first type of scintillation detector discriminator assembly used in the prior art.

Referring to the drawings, FIG. 1 diagrammatically shows a typical conventional discriminator for use with a scintillation detector. The output of the scintillator, not shown, is fed to a timing discriminator 20 and also to an energy discriminator 21. The output of time discriminator 20 is fed to one input terminal of a 2-input transmission gate 22 via a long precision delay device 23. The output of the energy discriminator 21 is fed to the other input terminal of gate 22 via an enable line 24. The output of the timing discriminator 20 is delayed sufficiently to allow energy verification before being delivered to the remainder of the system via gate output line 25. The main drawback of this configuration is the timing instability of the delay device 23, this being proportional to the magnitude of the delay itself. With the older sodium iodide detectors the delay required for reliable energy verification is sufficiently small so that no great problem exists, and in some instances energy verification is even dispensed with entirely. However, with the new bismuth germanate detectors a much longer delay is required, causing a serious problem.

Figure 2:
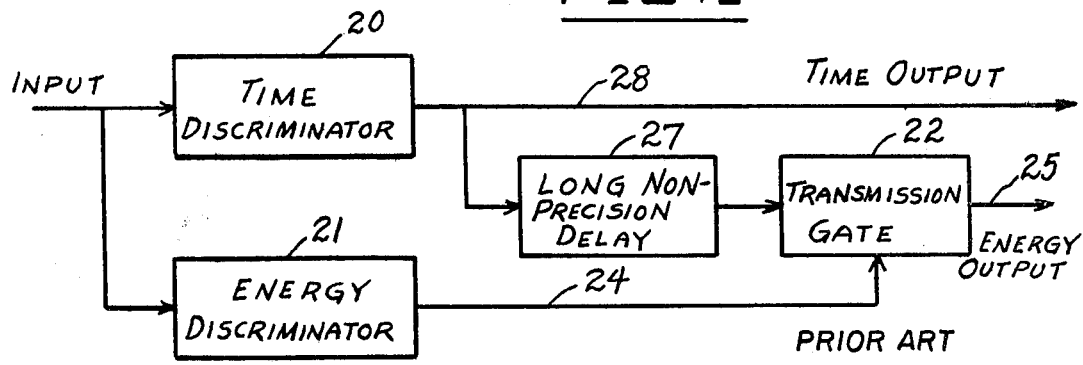
FIG. 2 is a block diagram showing a second type of scintillation detector discriminator assembly, showing a modification of the system of FIG. 1 to provide a longer time delay for energy verification.

One way to alleviate this is to employ a different type of data handling system which can utilize time and energy signals displaced in time (details of such a system are not included herein). This approach may involve use of a discriminator assembly with a configuration such as that diagrammatically shown in FIG. 2. This system is very similar to the configuration of FIG. 1 except that the long delay device 27 does not have to be as precise, since it does not affect the timing accuracy of the timing pulse delivered via line 28. Thus, the configuration of FIG. 2 overcomes the principal drawback of the system of FIG. 1, but unfortunately at the expense of introducing a new problem. Since the timing output pulses provided in line 28 are not subject to any energy verification, the number due to low-energy spurious signals might well exceed the count rate capacity of the subsequent system, causing saturation. The system according to the present invention, shown in FIG. 3, is intended to overcome this problem.

Figure 3:
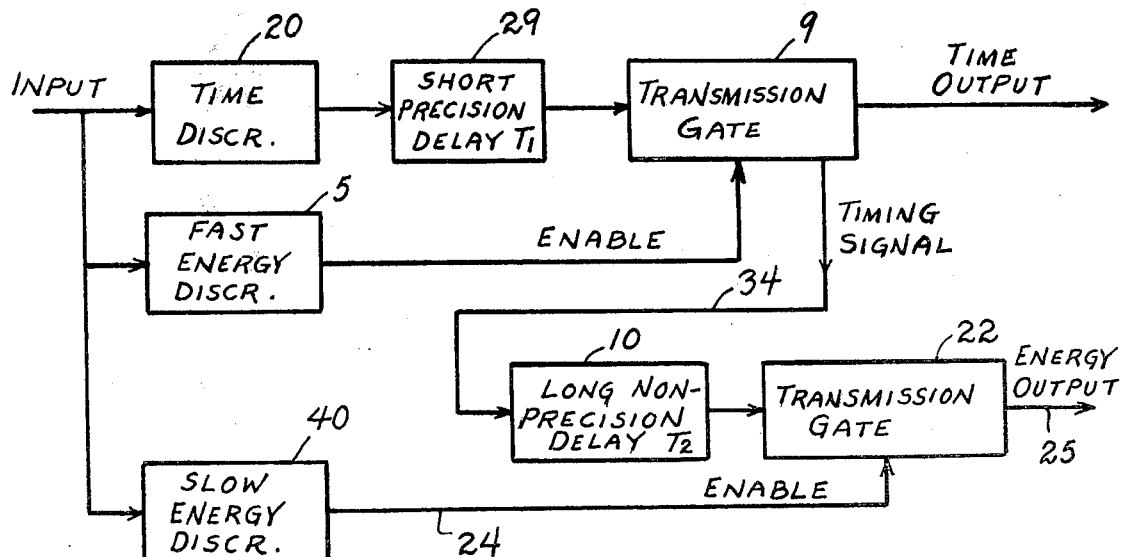
FIG. 3 is a block diagram broadly showing an improved scintillation detector discriminator assembly according to the present invention.

In the system of FIG. 3, the detector output is fed to the time discriminator 20 and the output of time discriminator 20 is fed via a short precision delay device 29 to one input terminal of a transmission gate device 9. The detector output signal is also fed to a fast energy discriminator 5 whose output is furnished as an enable signal to the other input terminal of gate device 9, providing time output pulses. Timing pulses from gate device 9 are furnished via line 34 to a long non-precision delay device 10, and thence to one input terminal of a transmission gate 22. The detector output signal is also fed through a slow energy discriminator 40 and an enable line 24 to another input terminal of gate 22, providing energy output pulses in an energy output line 25, which are furnished to the subsequent portion of the system. Thus, basically the configuration of FIG. 3 uses a fast approximate energy verification (by employing fast energy discriminator 5) together with a short precision delay (employing short precision delay device 29) to control the gate device 9 in a manner to eliminate most timing pulses due to very low-energy spurious inputs. The resulting timing outputs are then provided (by means of long non-precision delay device 10 and slow energy discriminator 40, which controls the gate 22) with a delayed energy verification in exactly the same manner as in the configuration of FIG. 2.

FIG. 4 is a schematic wiring diagram of a discriminator constructed generally in accordance with the system block diagram of FIG. 3. In this wiring diagram, the transistors 1 to 4, together with their associated components, form the time discriminator 20 of FIG. 3. The fast energy discriminator 5 comprises an LM361 comparator with one input wire 42 coupled to the discriminator input line 41 to receive a signal from the associated detector, with its other input wire 44 connected to an energy reference voltage. The comparator output wire 45 is arranged to provide an enable signal to a gate 50 to pass a timing signal via wire 51 from device 29 to one input wire 46 of gate device 9, via a flip-flop 14. The slow energy discriminator 40 comprises an input R-C circuit 6 coupled to input wire 41 and a comparator 7 with one input terminal receiving the output voltage signal from R-C circuit 6 via a wire 48 and its other input terminal connected to the reference voltage wire 44. The output of comparator 7 is connected via enable wire 24 to one input terminal of transmission gate 22. The short precision delay device 29 comprises logic gates 8 and 9' plus all the intervening gates shown in FIG. 4. Delay device 29 provides the short precision delay $T_1$. Monostable 10 provides the long delay $T_2$. The output of monostable 10 is connected via wire 52 to the remaining input terminal of transmission gate 22. A timing signal from gate 9' is connected to the input of monostable 10 via wire 34.

Feedback wire 11 recirculates the timing signal so that the individual gate delay of several gates, starting with gate 8, is encountered twice. This is desirable in order to achieve the required delay with a reasonable number of gates. Flip-flop 12 and feedback wire 13 stop the recirculation after one iteration. Flip-flop 14 is either set or not set, depending on the fast energy verification, prior to the arrival of the timing information at gate 9', so that the timing signal output from gate 9' is not subject to a slight time shift for pulses which just barely pass the initial energy verification.

While a specific embodiment of an improved discriminator circuit for use with a scintillation detector has been disclosed in the foregoing description, it will be understood that various modifications within the scope of the invention may occur to those skilled in the art. Therefore it is intended that adaptations and modifications should and are intended to be comprehended within the meaning and range of equivalents of the disclosed embodiment.

What is claimed is:

1. A discriminator circuit for use with a scintillation detector comprising input terminal means, a time discriminator, means connecting said input terminal means to the input of said time discriminator, a two-input time output transmission gate, means including a short time delay device connecting the output of said time discriminator to one input terminal of said time output transmission gate, means including a fast response energy discriminator connecting said input terminal means to the other input terminal of said time output transmission gate, a two-input energy transmission gate, means deriving a timing signal from said short time delay device, means including a long time delay device connecting said timing signal to one input terminal of said energy transmission gate, and means including a slow response energy discriminator connecting said input terminal means to the other input terminal of said energy transmission gate, said short and long time delay devices each providing a time delay respectively shorter and longer than the decay time of said scintillation detector, and said fast and slow discriminators each havng a time constant respectively shorter and longer than the time constant of said scintillation detector, whereby said energy transmission gate provides an output which is substantially free of outputs caused by low-energy spurious signals entering said intput terminal means.

2. The discriminator circuit of claim 1, and wherein said short time delay device provides a delay of the order of 50 nanoseconds.

3. The discriminator circuit of claim 2, and wherein said long time delay device provides a delay of the order of 500 nanoseconds.

4. The discriminator circuit of claim 1, and wherein said short time delay device is of the precision type.

5. The discriminator circuit of claim 4 and wherein said long time delay device is of the non-precision type.

6. The discriminator circuit of claim 1, and wherein said time discriminator comprises a plurality of interconnected transistors.

7. The discriminator circuit of claim 1, and wherein said short time delay device includes a plurality of serially-interconnected NOR gates terminating in an AND gate.

8. The discriminator circuit of claim 1, and wherein said long time delay device comprises a monostable.

9. The discriminator circuit of claim 1, and wherein said slow response energy discriminator comprises an R-C circuit and a comparator having one input terminal connected to the output of said R-C circuit and provided with a reference voltage source connected to the other input terminal of the comparator.

10. The discriminator circuit of claim 9, and wherein said fast response energy discriminator comprises a second comparator, means connecting one input terminal of said second comparator to said first-named input terminal means, and means connecting the other input terminal of said second comparator to said reference voltage source.

11. The discriminator circuit of claim 1, and wherein said short two delay device includes a plurality of serially-interconnected NOR gates terminating in an AND gate and including flip-flop means connected between the terminal AND gate and the remainder of the short time delay device.

12. The discriminator circuit of claim 11, and wherein said short time delay device includes feedback means to recirculate the timing signal so that the individual gate delay of several gates is encountered twice.

13. The discriminator circuit of claim 12, and additional feedback means connected between said flip-flop means and the NOR gates to stop the recirculation after one iteration.

14. The discriminator circuit of claim 1, and wherein said slow response energy discriminator comprises an R-C circuit and a first comparator having one input terminal connected to the output of said R-C circuit, and wherein said fast response energy discriminator comprises a second comparator, means connecting one input terminal of said second comparator to said first-named input terminal means, a common energy reference voltage source, and means connecting the remaining input terminals of said first and second comparators to said common energy reference voltage source.

15. The discriminator circuit of claim 1, wherein said scintillation detector is of the bismuth germanate type.

* * * * *